(12) United States Patent
Chujo (10) Patent No.: US 7,281,172 B2
(45) Date of Patent: Oct. 9, 2007

(54) FAULT INFORMATION COLLECTION PROGRAM AND APPARATUS

(75) Inventor: Mikiya Chujo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 399 days.

(21) Appl. No.: 10/421,778

(22) Filed: Apr. 24, 2003

(65) Prior Publication Data

US 2004/0044929 A1    Mar. 4, 2004

(30) Foreign Application Priority Data

Aug. 29, 2002  (JP) .............................. 2002-250050

(51) Int. Cl.
*G06F 11/00* (2006.01)

(52) U.S. Cl. .............................. 714/48; 714/47; 714/45

(58) Field of Classification Search .................. 714/45, 714/47, 48
See application file for complete search history.

(56) References Cited

U.S. PATENT DOCUMENTS

| 6,381,710 | B1 * | 4/2002 | Kim ............................. 714/45 |
| 6,532,554 | B1 * | 3/2003 | Kakadia ....................... 714/43 |
| 6,792,564 | B2 * | 9/2004 | Ahrens et al. ................ 714/45 |
| 2002/0161877 | A1 * | 10/2002 | Stevenson et al. .......... 709/223 |
| 2003/0074607 | A1 * | 4/2003 | Brundridge et al. .......... 714/48 |

FOREIGN PATENT DOCUMENTS

| JP | 9-321868 | 12/1997 |
| JP | 10-301815 | 11/1998 |
| JP | 2000-276421 | 10/2000 |

OTHER PUBLICATIONS

Japanese Patent Abstract No. 01-123355 dated May 16, 1989.

* cited by examiner

*Primary Examiner*—Scott Baderman
*Assistant Examiner*—Brian Assessor
(74) *Attorney, Agent, or Firm*—Staas & Halsey LLP (57) ABSTRACT

A fault information collection program capable of accurately determining redundancy of information related to an identical fault even in cases where information indicating the same fault of the same target of monitoring is received from multiple devices. When new fault information including fault detection date and time is input, the latest fault information indicating a fault related to the fault identical with that of the new fault information is acquired from a message information storage means storing a plurality of past fault information including detection dates and times of faults. It is then determined whether or not a predetermined messaging interval has elapsed since the fault detection date and time indicated by the latest fault information until the fault detection date and time indicated by the new fault information. If the messaging interval has elapsed, the new fault information is stored in the message information storage means as valid fault information.

7 Claims, 9 Drawing Sheets

110 MESSAGE INFORMATION STORAGE SECTION

| FAULT MESSAGE NO. | DETECTION DATE & TIME | TARGET NODE | SUPERVISORY SERVER | FAULT TYPE NO. | MESSAGING INTERVAL | DETAILED INFORMATION |
|---|---|---|---|---|---|---|
| M0001 | 2002/8/1 12:15 | A01 | B01 | ERROR#1 | 10 MIN. | ... |
| M0002 | 2002/8/1 12:16 | A03 | B02 | ERROR#4 | 5 MIN. | ... |
| ⋮ | ⋮ | ⋮ | ⋮ | ⋮ | ⋮ | ⋮ |
| M0015 | 2002/8/1 12:25 | A01 | B01 | ERROR#1 | 10 MIN. | ... |
| ⋮ | ⋮ | ⋮ | ⋮ | ⋮ | ⋮ | ⋮ |
| M0021 | 2002/8/1 12:38 | A01 | B02 | ERROR#1 | 10 MIN. | ... |
| ⋮ | ⋮ | ⋮ | ⋮ | ⋮ | ⋮ | ⋮ |
| M0051 | 2002/8/1 12:48 | A01 | B02 | ERROR#1 | 10 MIN. | ... |
| ⋮ | ⋮ | ⋮ | ⋮ | ⋮ | ⋮ | ⋮ |

110 MESSAGE INFORMATION STORAGE SECTION

| FAULT MESSAGE NO. | DETECTION DATE & TIME | TARGET NODE | SUPERVISORY SERVER | FAULT TYPE NO. | MESSAGING INTERVAL | DETAILED INFORMATION |
|---|---|---|---|---|---|---|
| M0001 | 2002/8/1 12:15 | A01 | B01 | ERROR#1 | 10 MIN. | ... |
| M0002 | 2002/8/1 12:16 | A03 | B02 | ERROR#4 | 5 MIN. | ... |
| ... | ... | ... | ... | ... | ... | ... |
| M0015 | 2002/8/1 12:25 | A01 | B01 | ERROR#1 | 10 MIN. | ... |
| ... | ... | ... | ... | ... | ... | ... |
| M0021 | 2002/8/1 12:38 | A01 | B02 | ERROR#1 | 10 MIN. | ... |
| ... | ... | ... | ... | ... | ... | ... |
| M0051 | 2002/8/1 12:48 | A01 | B02 | ERROR#1 | 10 MIN. | ... |
| ... | ... | ... | ... | ... | ... | ... |

FAULT INFORMATION COLLECTION PROGRAM AND APPARATUS

BACKGROUND OF THE INVENTION (1) Field of the Invention

The present invention relates to fault information collection program and apparatus for monitoring network environments, and more particularly, to fault information collection program and apparatus capable of receiving network state-indicative messages in a redundant configuration.

(2) Description of the Related Art

With the recent progress of computerization of business transactions, many corporations have their own in-house computer networks. It is, therefore, generally the case that documents created for transactions, for example, are distributed through the network to the persons concerned, with the use of functions such as electronic mail and groupware.

Since daily transactions are thus deeply involved with the network, damage to the transactions is greater than ever if fault occurs in the network. Accordingly, there has been a demand that the network state be monitored and that when a fault has occurred or an event that can possibly cause a fault is detected, measures be promptly taken.

In the case of monitoring a large-scale network constituted by a plurality of small-scale networks, numerous engineers who take charge of network management are needed if the engineers are assigned to the respective small-scale networks for monitoring, which leads to inefficiency. A method has therefore been adopted wherein a specified server collects information about faults occurring on the networks and analyzes the faults and the like. This permits efficient monitoring of networks.

When a fault has occurred on the networks, no measures can be taken unless information indicating the fault reaches the server. Accordingly, where remote networks are monitored by the server, it is necessary that information about faults of the individual networks should be sent to the server without fail.

Generally, therefore, there is provided redundant paths to transfer information from a target network to be monitored to the server. That is, a plurality of communication paths are provided for sending fault information about a fault of the target network to the management server. Fault information is usually transferred to the management server through one path, and if a fault occurs in this path, the information is transferred through another path. In this manner, fault information reaches the management server without fail.

In the system in which paths are switched in case of fault occurrence, however, a problem arises in that no fault information reaches the server during the period after a fault occurs in the original path until the paths are switched following confirmation of the fault.

To eliminate the drawback, a method may be adopted in which the same fault information is always sent to the server in parallel through a different path. With such method, even if a fault occurs in one communication path, the fault information passing through the other communication path can reach the server.

However, with this method, the management server is unable to determine whether an identical fault has occurred a plurality of times or a single fault has been notified in parallel. For certain types of fault on the network, different measures need to be taken depending on the frequency of occurrences of fault, and therefore, such parallel notification can confuse the system administrator.

As a technique of preventing parallel notification, a mutual supervisory control system is disclosed in Unexamined Japanese Patent Publication No. 1-123355, for example. According to this invention, the transmitting side transmits an identical telegram in parallel to a plurality of physical communication paths, and the receiving side accepts the telegram arriving first and discards the later arriving telegrams. Thus, even in the event a fault occurs in one physical communication path, the telegram passing through another physical communication path can reach the receiving side. Consequently, the telegram notifying of a fault can be transferred to another computer without fail.

In the invention disclosed in the above publication, the multiple telegrams output in parallel from a host computer are affixed with identical identification information (time identifier, serial number). A host computer of the receiving side compares the arrival times of telegrams including the same identification information, to discard the later arriving telegrams among the telegrams output in parallel.

However, in the case where telegrams are originated from a single host computer as in the invention disclosed in the above publication, the transmission of telegrams is disrupted if a fault occurs in the host computer, even though a plurality of physical communication paths are provided. The state of one network may therefore be monitored by a plurality of computers (supervisory servers) (redundancy is configured inclusive of supervisory servers). In this case, however, it is difficult to affix identical identification information to telegrams which are output in parallel from different supervisory servers.

For example, in the case of monitoring a network state by polling, supervisory servers differ from each other in polling timing, so that a fault caused by an identical event is detected at different times. As a result, the receiving side is unable to determine whether or not a received message is based on the same fault (whether the received message is a redundant message) by merely checking the fault detection time.

SUMMARY OF THE INVENTION

The present invention was created in view of the above circumstances, and an object thereof is to provide fault information collection program and apparatus capable of accurately determining redundancy of information related to an identical fault even in cases where information indicating the state of an identical target of monitoring is received from a plurality of devices.

To achieve the object, there is provided a fault information collection program for collecting fault information through a redundant network. The fault information collection program causes a computer to perform a process of acquiring, in response to input of new fault information including detection date and time of a fault, the latest fault information indicative of a fault related to a fault identical with that of the new fault information from a message information storage means storing a plurality of past fault information including detection dates and times of faults, determining whether or not a predetermined messaging interval has elapsed since the detection date and time of the fault indicated by the latest fault information until the detection date and time of the fault indicated by the new fault information, and storing the new fault information in the message information storage means as valid fault information if the predetermined messaging interval has elapsed.

Further, to achieve the above object, there is provided a fault information collection apparatus for collecting fault information through a redundant network. The fault information collection apparatus comprises a message information storage means for storing a plurality of past fault information including detection dates and times of faults, an acquisition means for acquiring, in response to new fault information including detection date and time of a fault, the latest fault information indicative of a fault related to a fault identical with that of the new fault information from the message information storage means, a determination means for determining whether or not a predetermined messaging interval has elapsed since the detection date and time of the fault indicated by the latest fault information, acquired by the acquisition means, until the detection date and time of the fault indicated by the new fault information, and a storing means for storing the new fault information in the message information storage means as valid fault information if it is judged by the determination means that the predetermined messaging interval has elapsed.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

First, the invention applied to the embodiments will be outlined, and then the embodiments will be described in detail.

Figure 1:
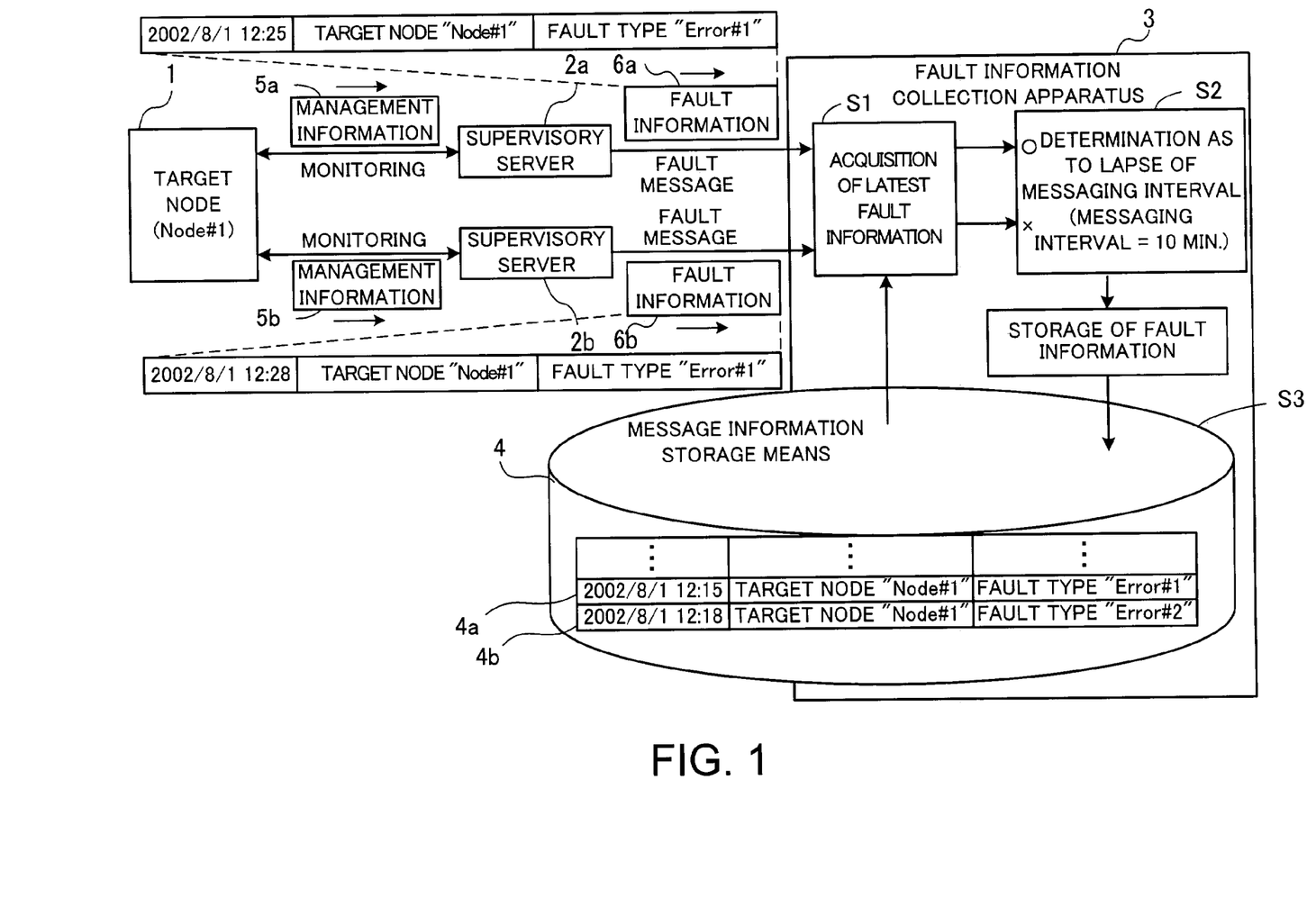
FIG. 1 is a conceptual diagram illustrating the invention applied to embodiments.

FIG. 1 is a conceptual diagram illustrating the invention applied to the embodiments. According to the present invention, a plurality of supervisory servers 2a, 2b are connected through a network to a node 1 which is a target of monitoring. In the following, it is assumed that the target node 1 has the node name "Node#1". The supervisory servers 2a, 2b are individually connected to a fault information collection apparatus 3 through respective networks. The fault information collection apparatus 3 has a message information storage means 4 for storing information about faults. The message information storage means 4 stores a plurality of past fault information 4a, 4b including detection dates and times of faults.

The supervisory server 2a monitors the operation of the target node 1. For example, the supervisory server 2a periodically acquires, from the target node 1, management information 5a indicative of the operation status of the target node 1. The supervisory server 2a then analyzes the management information 5a and, if it is judged that a fault has occurred, transmits fault information 6a (sends a fault message) to the fault information collection apparatus 3. Fault referred to herein includes various events (increase of communication load) etc. that cause faults.

Similarly, the supervisory server 2b monitors the operation of the target node 1. For example, the supervisory server 2b periodically acquires, from the target node 1, management information 5b indicative of the operation status of the target node 1. The intervals at which the management information 5b is acquired are equal to those at which the supervisory server 2a acquires the management information 5a. The supervisory server 2b analyzes the management information 5b and, if it is judged that a fault has occurred, transmits fault information 6b (sends a fault message) to the fault information collection apparatus 3.

Thus, according to the present invention, the target node 1 is monitored in a redundant network environment, and the fault information 6a, 6b is sent to the fault information collection apparatus 3. In the example shown in FIG. 1, the fault information 6a, 6b includes information such as fault detection date and time, node name of the target node 1 and fault type. The fault information 6a output from the supervisory server 2a indicates "12:25, Aug. 1, 2002" as the fault detection date and time, "Node#1" as the target node name, and "Error#1" as the fault type. The fault information 6b output from the supervisory server 2b indicates "12:28, Aug. 1, 2002" as the fault detection date and time, "Node#1" as the target node name, and "Error#1" as the fault type.

When input with the new fault information, the fault information collection apparatus 3 acquires, from the message information storage means 4, the latest fault information related to a fault identical with that of the new fault information, that is, the latest fault information indicating, for example, the same target node name and fault type as those indicated by the new fault information (Step S1). In the example of FIG. 1, when the fault information 6a is input, the fault information 4a is acquired (fault information 4b indicates a different fault type and thus is not acquired). The fault information 6a is finally stored in the message information storage means 4, and then, when the fault information 6b is input, the fault information 6a stored in the message information storage means 4 is acquired.

Subsequently, it is determined whether or not a predetermined messaging interval has elapsed since the fault detection date and time indicated by the latest fault information until the fault detection date and time indicated by the new fault information (Step S2). In the example of FIG. 1, the messaging interval is set to 10 minutes.

The fault information 6a is compared with the fault information 4a. The fault detection date and time of the latest fault information 4a are "12:15, Aug. 1, 2002", while the fault detection date and time of the new fault information 6a are "12:25, Aug. 1, 2002", which indicates a lapse of 10 minutes. In this case, therefore, it is judged that the messaging interval has elapsed.

The fault information 6b is compared with the fault information 6a. The fault detection date and time of the latest fault information 6a are "12:25, Aug. 1, 2002", while the fault detection date and time of the new fault information 6b are "12:28, Aug. 1, 2002", which indicates a lapse of only 3 minutes. In this case, therefore, it is judged that the messaging interval has not elapsed yet.

The messaging interval may be specified in the latest fault information, for example. In this case, when outputting the fault information 6a, 6b, the supervisory servers 2a, 2b include, in the fault information 6a, 6b, a value of messaging interval that matches the details of the fault. For the messaging interval, a polling interval, for example, is used at which the supervisory servers 2a, 2b poll the target node 1 to acquire the management information 5a, 5b indicative of the operation status of the target node 1.

If it is judged that the messaging interval has elapsed, the new fault information is stored in the message information storage means 4 as valid fault information (Step S3). In the example of FIG. 1, the fault information 6a is stored in the message information storage means 4, but the fault information 6b is not stored but discarded.

In this manner, new fault information is stored only when the messaging interval has elapsed between the detection dates and times of the new fault information and the latest fault information related to the identical fault, whereby only one out of a plurality of fault information received in parallel due to the redundant configuration can be stored in the message information storage means 4. Consequently, even in the case where the network environment is monitored simultaneously by the multiple supervisory servers 2a, 2b, the registration of redundant fault information can be prevented.

Specifically, the shortest period for the detection of faults by the supervisory servers 2a, 2b (e.g., the polling intervals for monitoring the target node 1) may be set as the predetermined messaging interval. If fault information related to the identical fault is received a plurality of times within a period shorter than the set interval, the fault information can be regarded as redundant fault information. When fault information related to the same event is received a plurality of times within a period shorter than the messaging interval, the second and succeeding fault information is discarded, whereby the registration of redundant fault information can be prevented.

Information indicating the network state may be acquired by polling, for example. By doing so, it is possible to simplify the configuration of the target node to be monitored. Namely, information about the network to which the target node is connected can be collected without the need to add a special function to the node. Embodiments of the present invention will be now described in detail with reference to a network monitoring system capable of collecting information by polling, by way of example.

Figure 2:
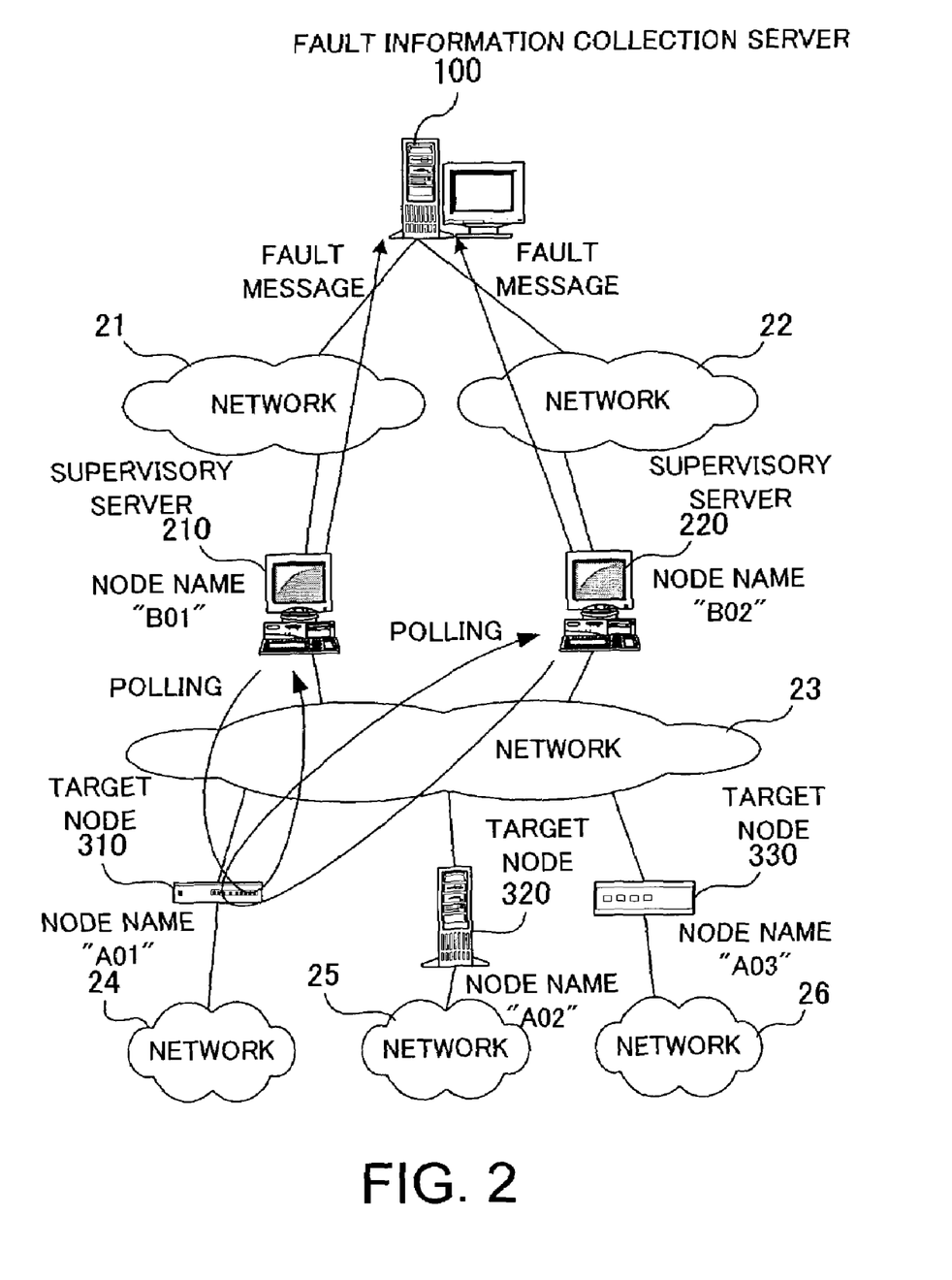
FIG. 2 is a diagram illustrating an exemplary configuration of a network monitoring system according to an embodiment.

FIG. 2 illustrates an exemplary configuration of a network monitoring system according to an embodiment. The network monitoring system of this embodiment is composed mainly of a fault information collection server 100, supervisory servers 210 and 220, and target nodes 310, 320 and 330 to be monitored.

The fault information collection server 100 is connected to the supervisory server 210 through a network 21, and is also connected to the supervisory server 220 through a network 22.

The supervisory server 210 is connected to the target nodes 310, 320 and 330 through a network 23. A node name identifying the supervisory server 210 on the networks is "B01". Similarly, the supervisory server 220 is connected to the target nodes 310, 320 and 330 through the network 23. A node name identifying the supervisory server 220 on the networks is "B02".

The target node 310 is connected to a network 24 and has the node name "A01" for identification on the networks. The target node 320 is connected to a network 25 and has the node name "A02" for identification on the networks. The target node 330 is connected to a network 26 and has the node name "A03" for identification on the networks.

The target nodes 310, 320 and 330 hold information (management information) about the operation status etc. of their respective connected networks, and successively update the information. For example, the target nodes 310, 320 and 330 monitor the states of their respective connected networks and hold information about the amounts of packets being transmitted per unit time through the respective networks, etc. The nodes 310, 320 and 330 capable of collecting such information may be routers, for example.

The two supervisory servers 210 and 220 each polls the target nodes 310, 320 and 330 through the network 23 to acquire the network management information held by the nodes. Simple network management protocol (SNMP), for example, may be used to acquire the network management information. The supervisory servers 210 and 220 analyze the acquired management information to determine the occurrence of fault. If it is judged that a fault has occurred, the supervisory servers 210 and 220 transmit fault information indicating the details of the fault to the fault information collection server 100.

The fault information collection server 100 receives the fault information transmitted from the supervisory servers 210 and 220 and stores the fault information. At this time, the fault information collection server 100 checks the fault information if it is redundant fault information, and stores only the firstly received fault information. Redundancy of fault information is detected by determining whether or not the predetermined messaging interval has elapsed since the fault detection date and time notified by the latest fault information which includes management information (target node, fault type number) common to that of the received fault information until the fault detection date and time notified by the received fault information.

For example, if the number of packets being transferred per unit time through the network 24 becomes too large, information indicative of an excessive number of transfer packets is stored in the target node 310. This information is acquired by polling by the individual supervisory servers 210 and 220. Each of the supervisory servers 210 and 220 detects that the number of transfer packets is excessively large, and transmits fault information to the fault information collection server 100. Consequently, the fault information collection server 100 receives the fault information indicative of the excessive number of transfer packets at the target node 310 in parallel from the supervisory servers 210 and 220.

The fault information collection server 100 stores the fault information that is received first. When fault information related to the identical fault is received thereafter, the fault information collection server 100 judges that the received information is redundant fault information, because the received information includes management information identical with that of the previously received fault information and the fault was detected within the predetermined messaging interval. The fault information collection server 100 then discards the redundant fault information that was input afterward.

Figure 3:
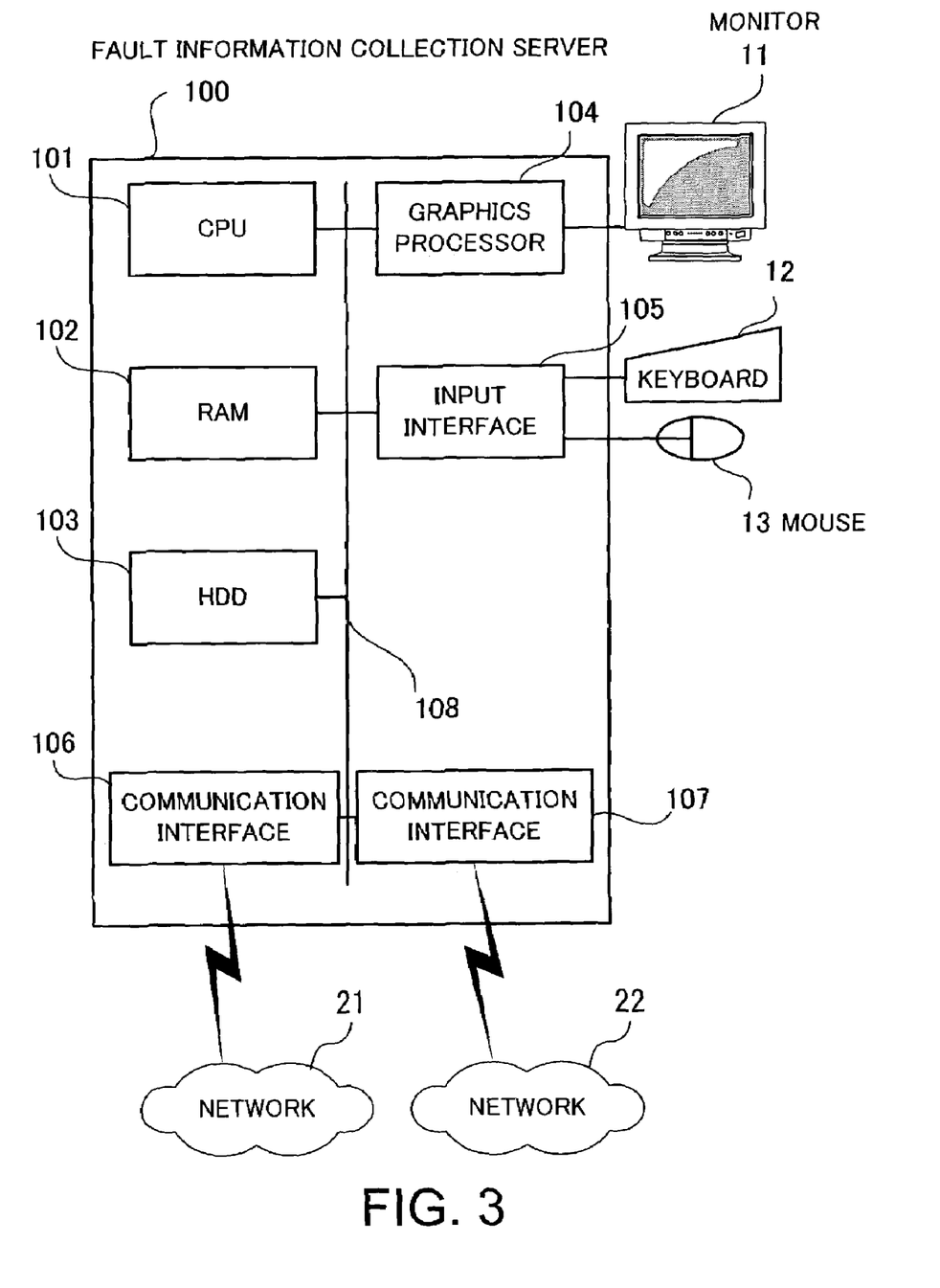
FIG. 3 is a diagram illustrating an exemplary hardware configuration of a fault information collection server according to the embodiment.

FIG. 3 shows an exemplary hardware configuration of the fault information collection server according to this embodiment. The fault information collection server 100 is in its entirety under the control of a central processing unit (CPU)

101. To the CPU 101 are connected, through a bus 108, a random access memory (RAM) 102, a hard disk drive (HDD) 103, a graphics processor 104, an input interface 105, and two communication interfaces 106 and 107.

The RAM 102 temporarily stores operating system (OS) programs and at least part of application programs executed by the CPU 101. The RAM 102 also stores various other data necessary for the processing by the CPU 101. The HDD 103 stores the OS and application programs.

The graphics processor 104 is connected to a monitor 11. In accordance with instructions from the CPU 101, the graphics processor 104 causes the monitor 11 to display images on the screen. The input interface 105 is connected to a keyboard 12 and a mouse 13. The input interface 105 sends signals input from the keyboard 12 and the mouse 13 to the CPU 101 through the bus 108.

The communication interface 106 is connected to the network 21 and transmits and receives data to and from other computers through the network 21. The communication interface 107 is connected to the network 22 and transmits and receives data to and from other computers through the network 22.

With the hardware configuration described above, the processing functions of the embodiment can be performed. Although in FIG. 3 is illustrated the hardware configuration of the fault information collection server 100 by way of example, the supervisory servers 210 and 220 and the target nodes 310, 320 and 330 may each have a similar hardware configuration.

Figure 4:
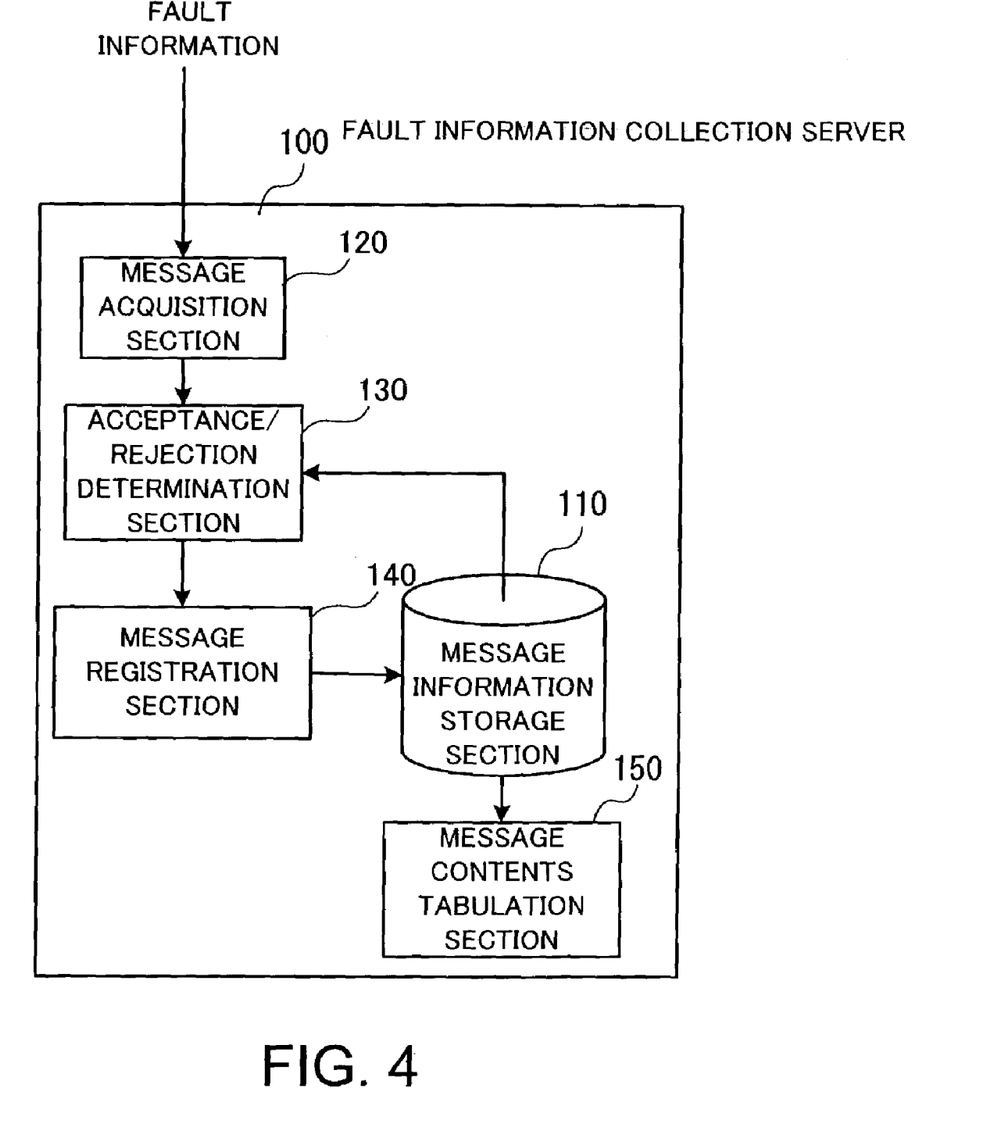
FIG. 4 is a functional block diagram illustrating processing functions of the fault information collection server.

FIG. 4 is a functional block diagram illustrating the processing functions of the fault information collection server. The fault information collection server 100 includes a message information storage section 110, a message acquisition section 120, an acceptance/rejection determination section 130, a message registration section 140, and a message contents tabulation section 150.

The message information storage section 110 is a storage area in which is recorded fault information that has been accepted as valid information, among those input in the past. Part of the storage area in the HDD 103 shown in FIG. 3 is used for this purpose, for example.

The message acquisition section 120 acquires fault information input through the networks 21 and 22, and transfers the acquired fault information to the acceptance/rejection determination section 130.

The acceptance/rejection determination section 130 accesses the message information storage section 110 to determine whether or not the fault information received from the message acquisition section 120 is valid fault information. Valid fault information is information which indicates the fault detection date and time after a lapse of a predetermined period from the fault detection date and time indicated by the previous fault information related to the identical fault. Namely, if the predetermined period has not elapsed yet, the received fault information is regarded as redundant fault information identical with the previous fault information. The acceptance/rejection determination section 130 transfers valid fault information to the message registration section 140 while it discards invalid fault information.

The message registration section 140 stores the valid fault information received from the acceptance/rejection determination section 130 in the message information storage section 110.

The message contents tabulation section 150 tabulates statistical information about the states of networks to be monitored, from among the fault information stored in the message information storage section 110, and outputs the results to the monitor 11 etc.

Operation of the network monitoring system configured as shown in FIGS. 2 to 4 will be now described.

Figure 5:
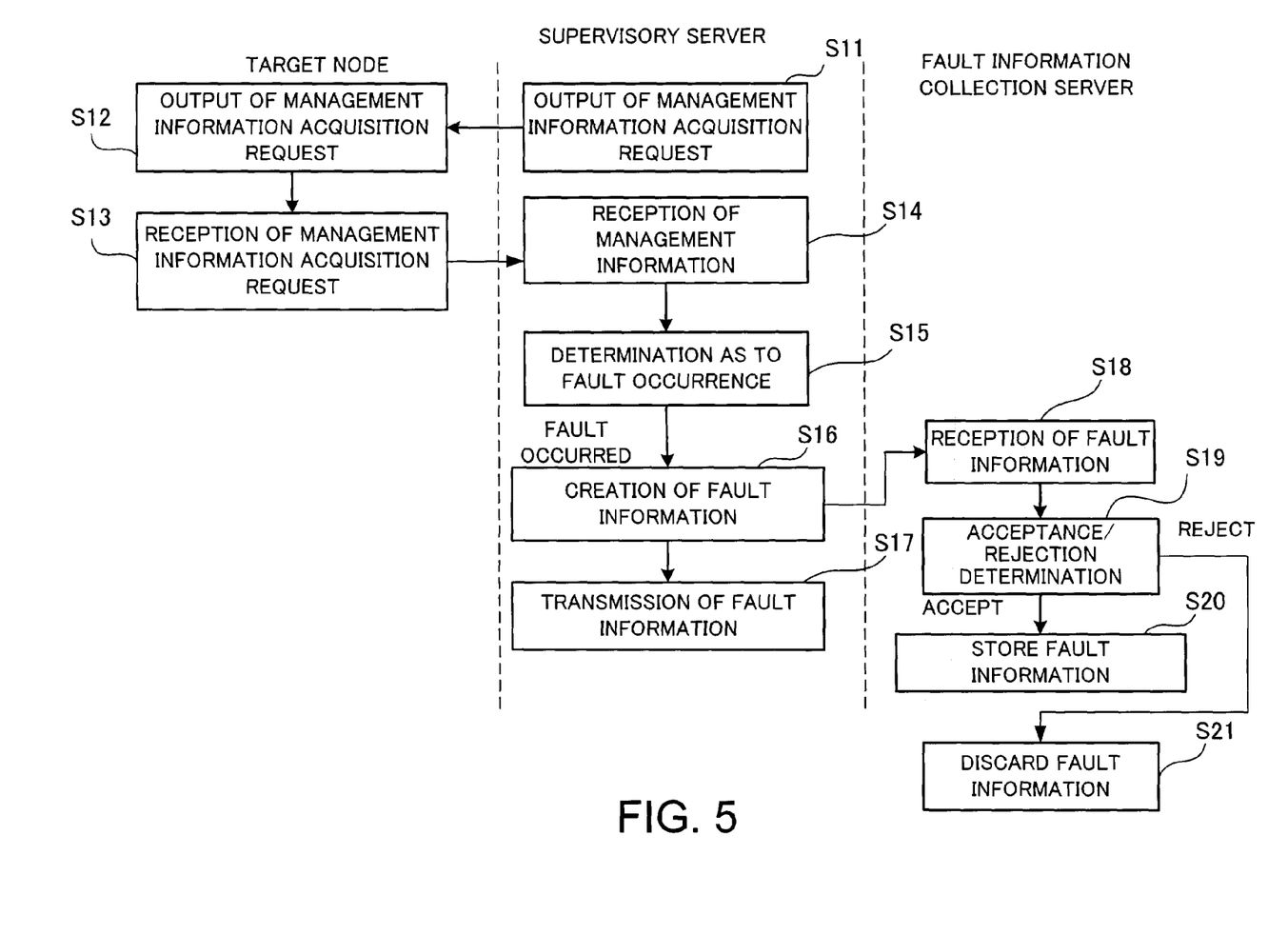
FIG. 5 is a diagram illustrating a sequence of operations of the network monitoring system.

FIG. 5 illustrates a sequence of operations of the network monitoring system, wherein fault information is collected by way of the target node 310, the supervisory server 210 and the fault information collection server 100.

The supervisory server 210 periodically outputs a management information acquisition request to the target node 310 (Step S11). The target node 310 receives the management information acquisition request transmitted from the supervisory server 210 (Step S12), and then transmits management information in response to the request to the supervisory server 210 (Step S13).

The supervisory server 210 receives the management information transmitted from the target node 310 (Step S14). Then, based on the received management information, the supervisory server 210 determines whether there is a fault in the target node 310 or in the state of the network 24 to which the node 310 is connected (Step S15). For example, if the load on the network 24 becomes equal to or higher than 30% of a maximum allowable load, it is judged that a fault has occurred.

If it is judged that a fault has occurred, the supervisory server 210 creates fault information (Step S16). Subsequently, the supervisory server 210 transmits the fault information to the fault information collection server 100. For example, the fault information is created as one file and the file is attached to electronic mail addressed to the fault information collection server 100, whereby the fault information can be transmitted to the fault information collection server 100.

The fault information collection server 100 receives the fault information (Step S18) and determines whether to accept the fault information (Step S19). If the fault information should be accepted, the fault information collection server 100 stores the fault information in the message information storage section 110 (Step S20). If the fault information should be rejected, the fault information collection server 100 discards the fault information (Step S21).

In this manner, when the management information acquired from the target node 310 indicates the occurrence of a fault, fault information is transmitted from the supervisory server 210 to the fault information collection server 100.

Figure 6:
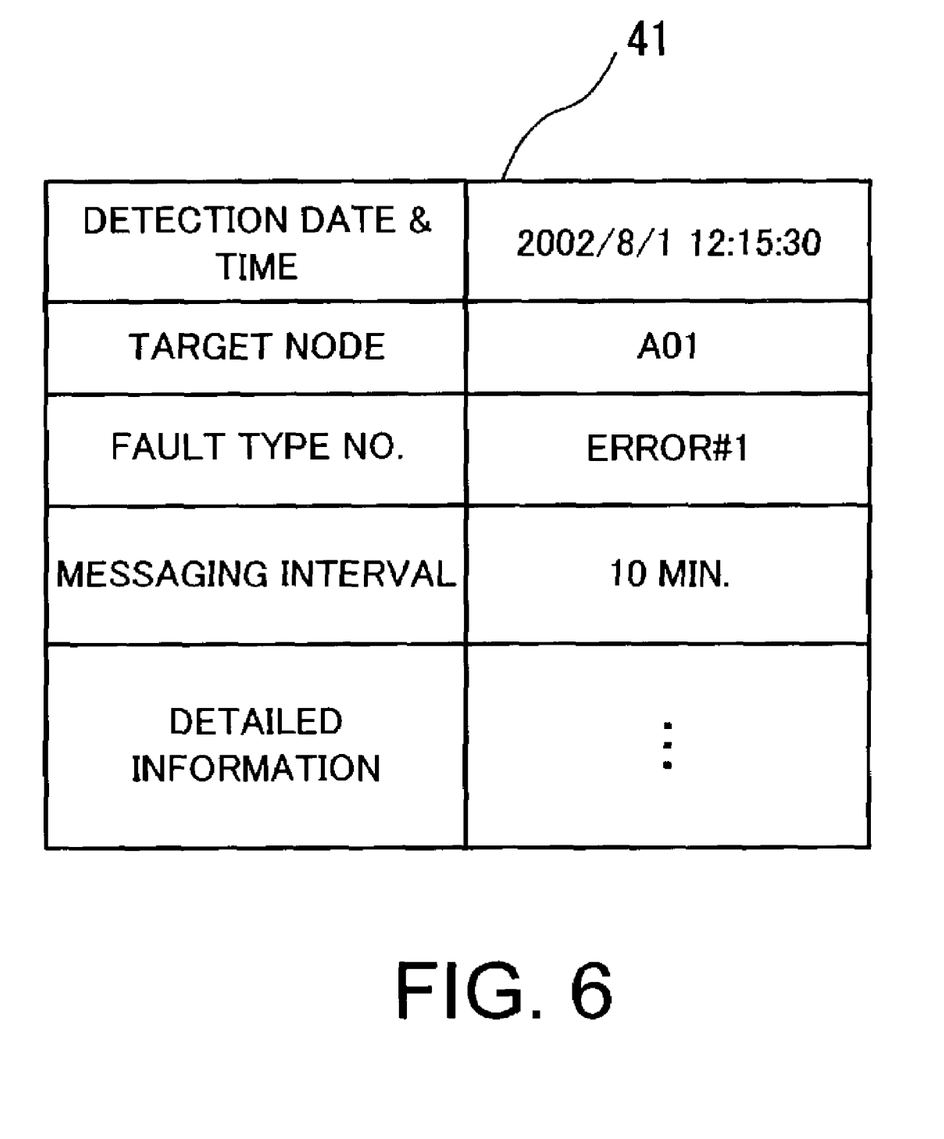
FIG. 6 is a diagram illustrating an exemplary data structure of fault information.

FIG. 6 illustrates an exemplary data structure of the fault information. The fault information 41 includes items of information such as detection date and time, target node, fault type number, messaging interval, and detailed information.

Under the item of detection date and time, the time at which the fault was detected by the supervisory server 210 is registered. Under the item of target node is registered the node name of the target node that originated the management information on the basis of which the fault has been detected. Under the item of fault type number is registered a code number indicating the type of the detected fault, and under the item of messaging interval is registered a fault messaging interval determined in advance with respect to the type of the detected fault. Under the item of detailed information, detailed information about the fault is registered.

Fault information having such a data structure is transmitted to the fault information collection server 100, and valid fault information, which has been ascertained to be of non-redundancy of past information, is stored in the message information storage section 110.

Figure 7:
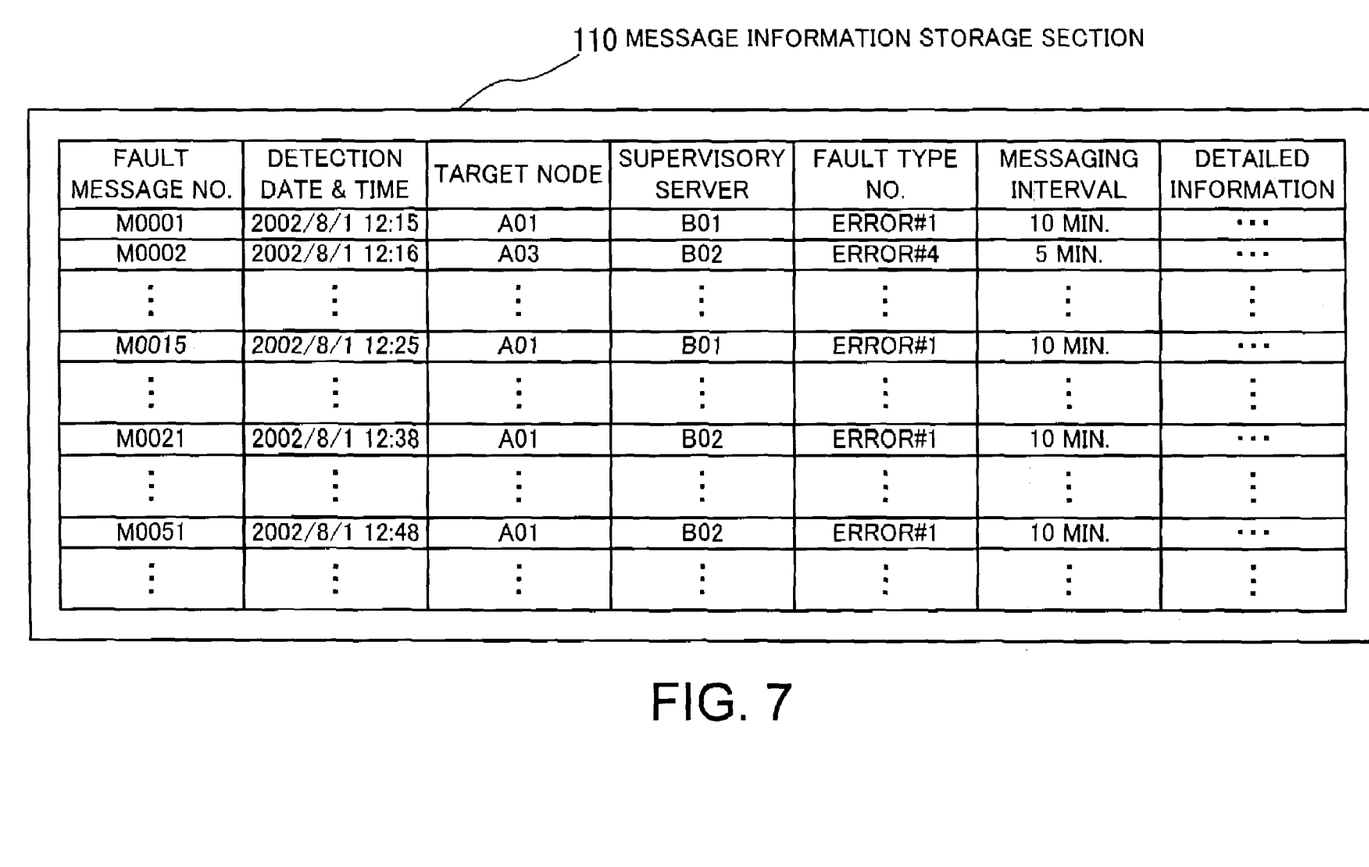
FIG. 7 is a diagram illustrating an example of data structure in a message information storage section.

FIG. 7 illustrates an example of data structure in the message information storage section. In the example shown in FIG. 7, the message information storage section 110 is provided with the fields "FAULT MESSAGE NO.", "DETECTION DATE & TIME", "TARGET NODE", "SUPERVISORY SERVER", "FAULT TYPE NO.", "MESSAGING INTERVAL", and "DETAILED INFORMATION". Items of information along each row are associated with one another.

In the field "FAULT MESSAGE NO.", an identification number uniquely identifying the registered fault message is registered. In the field "DETECTION DATE & TIME" is registered the date and time when the fault was discovered, and in the field "TARGET NODE" is registered the node name of the target node that originated the management information on the basis of which the fault has been detected. In the field "SUPERVISORY SERVER", the node name of the supervisory server that originated the fault information is registered, and in the field "FAULT TYPE NO.", identification information for identifying the type of the discovered fault is registered. In the field "MESSAGING INTERVAL", the fault messaging interval matching the details of the fault is registered, and in the field "DETAILED INFORMATION", detailed information about the fault is registered.

Figure 8:
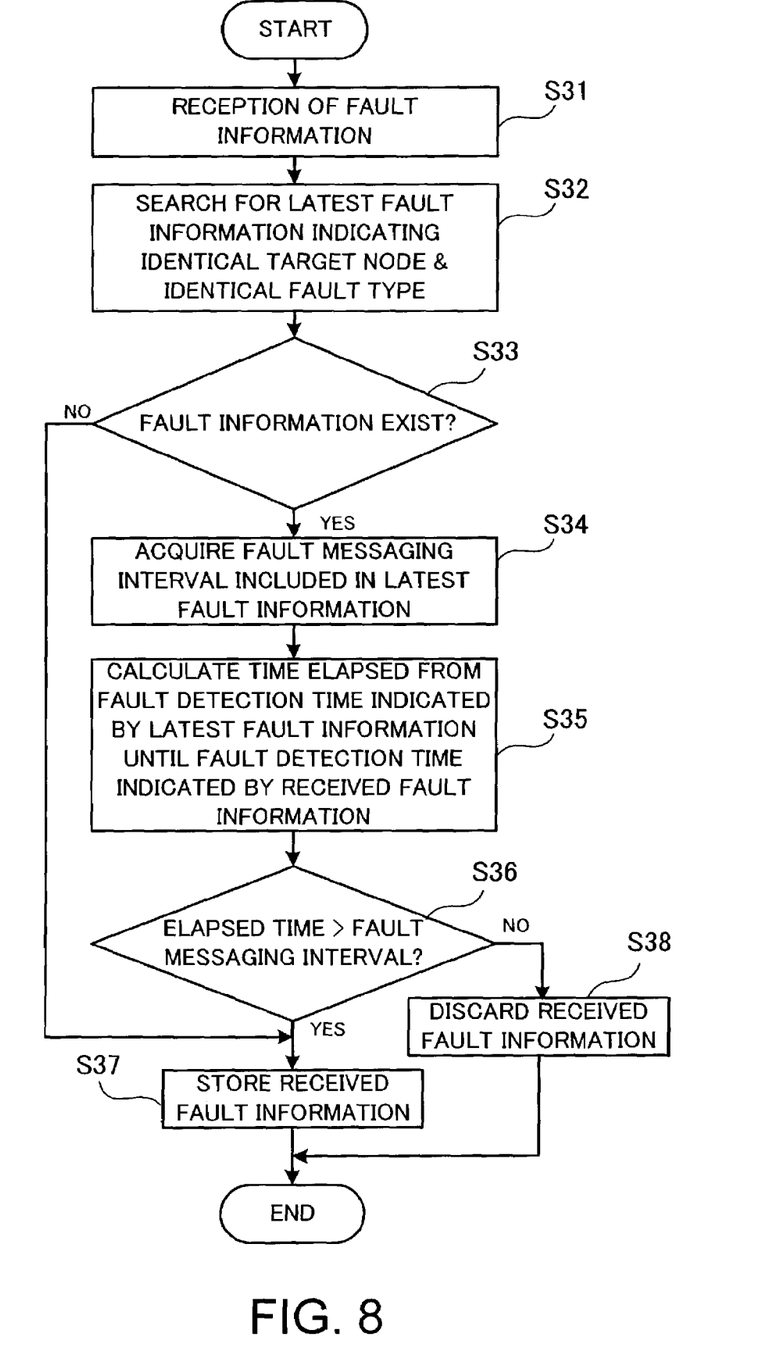
FIG. 8 is a flowchart illustrating details of a process executed by the fault information collection server.

FIG. 8 is a flowchart illustrating details of a process executed by the fault information collection server. In the following, the process shown in FIG. 8 will be explained in order of step number.

[Step S31] The message acquisition section 120 receives fault information.

[Step S32] The acceptance/rejection determination section 130 searches the message information storage section 110 for the latest fault information which indicates the same target node as well as the same fault type as specified in the fault information received in Step S31.

[Step S33] The acceptance/rejection determination section 130 determines whether or not matching fault information is detected in Step S32. If such information is detected, the process proceeds to Step S34; if not, the process proceeds to Step S37.

[Step S34] The acceptance/rejection determination section 130 acquires the fault messaging interval included in the detected fault information.

[Step S35] The acceptance/rejection determination section 130 calculates a time elapsed from the fault detection date and time included in the detected fault information until the fault detection date and time indicated by the fault information received in Step S31.

[Step S36] The acceptance/rejection determination section 130 determines whether or not the elapsed time calculated in Step S35 is longer than or equal to the fault messaging interval included in the detected fault information. If the elapsed time is longer than or equal to the fault messaging interval, the fault information received in Step S31 is transferred to the message registration section 140 and the process proceeds to Step S37. If the elapsed time is shorter than the fault messaging interval, the process proceeds to Step S38.

[Step S37] The message registration section 140 stores the fault information received in Step S31 in the message information storage section 110, whereupon the process ends.

[Step S38] The acceptance/rejection determination section 130 discards the fault information received in Step S31, whereupon the process ends.

Thus, in cases where fault information is input in parallel, only the first fault information can be stored in the message information storage section 140.

Figure 9:
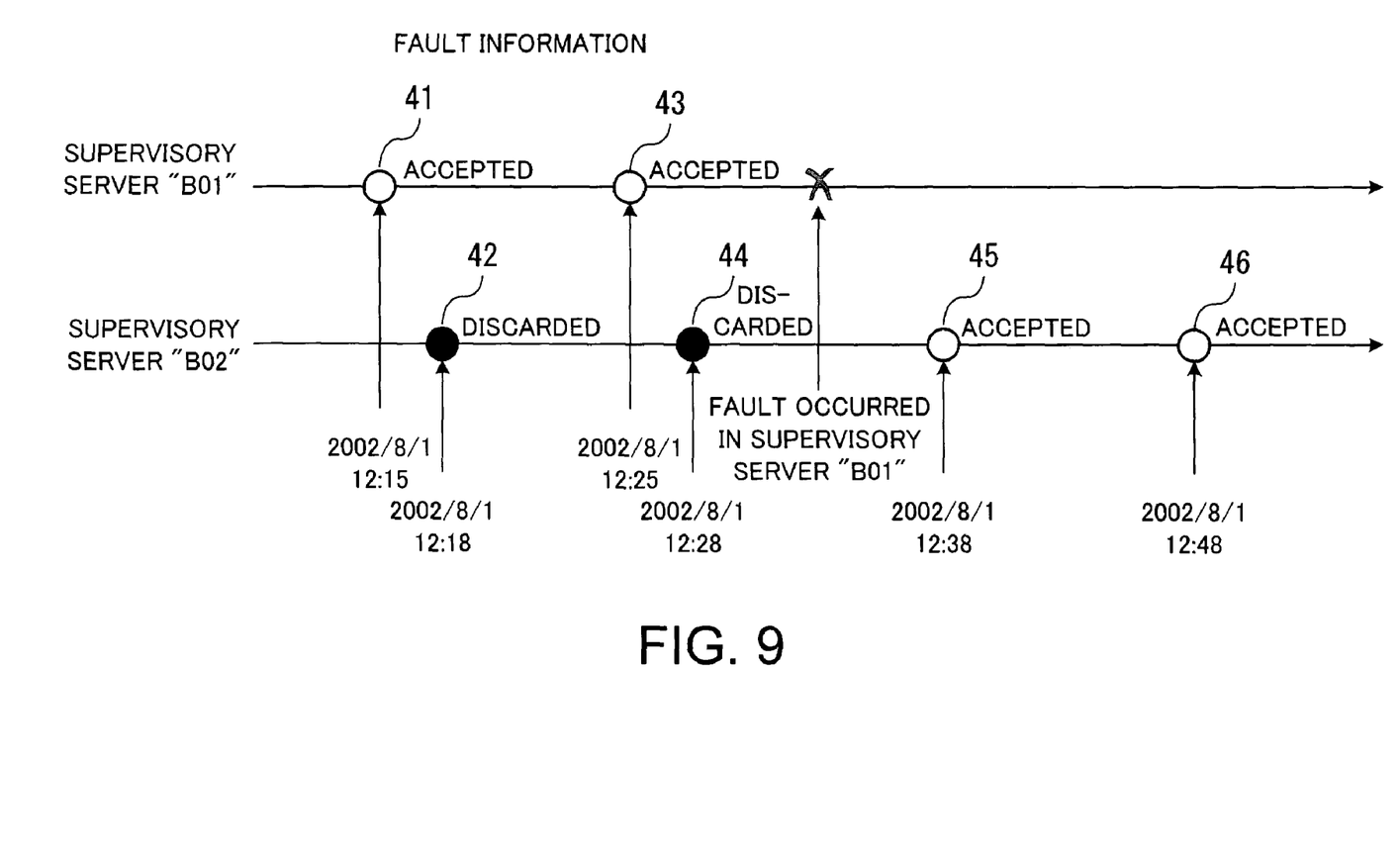
FIG. 9 is a diagram illustrating examples of determination as to whether fault information should be registered or not.

FIG. 9 illustrates examples of determination as to whether fault information should be registered or not. In FIG. 9, time progresses from left to right on the time axis, and the figure illustrates an example in which the supervisory servers 210 and 220 with the node names "B01" and "B02", respectively, are monitoring the target node 310 and send fault information.

Let it be assumed that the load on the network 24 to which the target node 310 is connected has become excessively large. It is also assumed that each of the supervisory servers 210 and 220 polls the target node 310 at intervals of 10 minutes to acquire management information about the load on the network 24.

In the example shown in FIG. 9, the fault was detected at the time "Jan. 8, 2002 12:15" (12:15, Aug. 1, 2002) by the supervisory server 210 with the node name "B01" and the fault information 41 was output from this server. The fault information 41 has contents shown in FIG. 6. Since the fault information 41 is the first fault information about the fault concerned, the fault information collection server 100 accepted the information and stored the same in the message information storage section 110. This fault information corresponds to the information with the fault message number "M0001" shown in FIG. 7.

The fault was detected thereafter at the time "Jan. 8, 2002 12:18" by the supervisory server 220 with the node name "B02", and fault information 42 was output. This fault information 42 indicates the target node and the fault type number identical with those included in the fault information 41. As seen from the example of FIG. 7, the fault information 41 indicates "10 MIN." as the messaging interval, whereas only three minutes have elapsed since the fault detection time of the fault information 41 until the fault detection time of the fault information 42. Accordingly, the fault information 42 was judged redundancy of the fault information 41 and thus was discarded.

Subsequently, the fault was detected at the time "Jan. 8, 2002 12:25" by the supervisory server 210 with the node name "B01", and fault information 43 was output. This fault information 43 was output after a lapse of 10 minutes from the fault detection date and time of the fault information 41. Thus, the messaging interval (10 min.) was judged to have elapsed and the fault information 43 was stored in the message information storage section 110. This fault information corresponds to the information with the fault message number "M0015" shown in FIG. 7.

The fault was detected thereafter at the time "Jan. 8, 2002 12:28" by the supervisory server 220 with the node name "B02", and fault information 44 was output. This fault information indicates the target node and the fault type number identical with those included in the fault information 43. In the example shown in FIG. 7, the fault information 43 indicates "10 MIN." as the messaging interval, whereas only three minutes have elapsed since the fault detection time of the fault information 43 until the fault detection time of the fault information 44. Accordingly, the fault information 44 was judged redundancy of the fault information 43 and thus was discarded.

It is assumed that a fault thereafter occurred in the supervisory server 210 itself, making the server 210 incapable of monitoring the target node 310. In this case, no fault information has been transmitted thereafter from the supervisory server 210 with the node name "B01" to the fault information collection server 100.

Consequently, the fault was detected at the time "Jan. 8, 2002 12:38" by the supervisory server 220 with the node name "B02", and fault information 45 was output. The fault information 45 was output after a lapse of 13 minutes from the fault detection date and time of the fault information 43. Thus, a period longer than the messaging interval has elapsed, so that the fault information 45 was stored in the message information storage section 110. This fault information corresponds to the information with the fault message number "M0021" shown in FIG. 7.

Subsequently, the fault was detected at the time "Jan. 8, 2002 12:48" by the supervisory server 220 with the node name "B02", and fault information 46 was output. The fault information 46 was output after a lapse of 10 minutes from the fault detection date and time of the fault information 45. Thus, the messaging interval was judged to have elapsed and the fault information 46 was stored in the message information storage section 110. This fault information corresponds to the information with the fault message number "M0051" shown in FIG. 7.

Thus, according to this embodiment, in the case where fault information is transmitted in parallel, fault information is accepted as valid information only if it indicates the fault detection date and time after a lapse of the predetermined messaging interval from the fault detection date and time of the previous fault information, whereby redundant fault information is prevented from being registered.

Further, the network monitoring system has a redundant configuration and fault information is transmitted through a plurality of paths. Accordingly, even if a fault occurs in part of the paths (supervisory servers etc.), fault information reaches the fault information collection server 100 without fail, and also the period over which no fault information is received is never prolonged to an undesirable extent.

In the foregoing description, fault information that is not accepted is discarded, but such fault information may be affixed with a flag indicative of invalidity and may be stored in the message information storage section 110, instead of being discarded. In this case, when the fault information are to be tabulated, the message contents tabulation section 150 tabulates only the fault information in the message information storage section 110 which is not affixed with the flag indicative of invalidity.

The processing functions described above can be performed by a computer. In this case, a fault information collection program is prepared, which describes processes for performing the functions of the fault information collection server. The fault information collection program is executed by a computer, whereupon the aforementioned processing functions are accomplished by the computer. The fault information collection program dscribing the required processes may be recorded on a computer-readeble recording medium. The computer-readable recording medium includes magnetic recording device, optical disc, magneto-optical recording meium, semiconductor memory, etc. Such a magnetic recording device may be hard disk drive (HDD), flexible disk (FD), magnetic tape, etc. As the optical disc, digital versatile disc (DVD), DVD-Random Access Memory (DVD-RAM), compact disc read only memory (CD-ROM), CD-R (Recordable)/RW (REWritable) or the like may be used. The magneto-optical recording medium includes magneto-optical disc (MO) etc.

To distribute the fault information collection program, portable recording media, such as DVD and CD-ROM, on which the program is recorded may be put on sale. Alternatively, the fault information collection program may be stored in the storage device of a server computer and may be transferred from the server computer to other computers through a network.

A computer which is to execute the fault information collection program stores in its storage device the fault information collection program recorded on a portable recording medium or transferred from the server computer, for example. Then, the computer runs the fault information collection program from its storage device and performs processes in accordance with the program. The computer may run the fault information collection program directly from the portable recording medium to perform processes in accordance with the program. Also, while receiving the fault information collection program being transferred from the server computer, the computer may sequentially run this program.

As described above, according to the present invention, new fault information is stored only if the messaging interval has elapsed between the fault detection dates and times included in the new fault information and the latest fault information related to the identical fault, whereby only one out of multiple fault information received in parallel because of redundant configuration can be stored in the message information storage means. Consequently, even in the case where the network environment is monitored simultaneously by a plurality of supervisory servers, it is possible to prevent redundant fault information from being registered.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer readable medium with a fault information collection program stored therein, for collecting fault information through a redundant network, wherein the fault information collection program causes a computer to perform a process of:

receiving messages containing fault information including indication of a fault, detection date and time of the fault, and messaging interval at which the messages are produced;

acquiring, in response to new fault information including detection date and time of a fault, the latest fault information indicative of a fault related to an event identical with that of the new fault information from message information storage means storing a plurality of fault information received in the past;

determining whether or not a predetermined messaging interval has elapsed since the detection date and time of the fault indicated by the latest fault information until the detection date and time of the fault indicated by the new fault information; and storing the new fault information in the message information storage means as valid fault information if the predetermined messaging interval has elapsed.

2. The fault information collection program according to claim 1, wherein the new fault information is discarded if the predetermined messaging interval has not elapsed yet.

3. The fault information collection program according to claim 1, wherein the predetermined messaging interval is an interval at which a supervisory server for monitoring a target node on the network polls the target node to acquire management information indicating an operating state of the target node.

4. The fault information collection program according to claim 1, wherein fault information stored in the message information storage means and indicating a target node and a fault type identical with those indicated by the new fault information is judged to be the fault information related to the identical fault.

5. A fault information collection apparatus for collecting fault information through a redundant network, comprising:
   receiving means for receiving messages containing fault information including indication of a fault, detection date and time of the fault, and messaging interval at which the messages are produced;
   message information storage means for storing a plurality of past fault information including detection dates and times of faults;
   acquisition means for acquiring, in response to new fault information including detection date and time of a fault, the latest fault information indicative of a fault related to a fault identical with that of the new fault information from said message information storage means;
   determination means for determining whether or not a predetermined messaging interval has elapsed since the detection date and time of the fault indicated by the latest fault information, acquired by said acquisition means, until the detection date and time of the fault indicated by the new fault information; and
   storing means for storing the new fault information in said message information storage means as valid fault information if it is judged by said determination means that the predetermined messaging interval has elapsed.

6. A fault information collection method for collecting fault information through a redundant network by means of a computer, comprising:
   receiving messages containing fault information including indication of a fault, detection date and time of the fault, and messaging interval at which the messages are produced;
   acquiring, in response to input of new fault information including detection date and time of a fault input to the computer, the latest fault information indicative of a fault related to a fault identical with that of the new fault information from message information storage means storing a plurality of fault information received in the past;
   determining whether or not a predetermined messaging interval has elapsed since the detection date and time of the fault indicated by the latest fault information until the detection date and time of the fault indicated by the new fault information; and
   storing the new fault information in the message information storage means as valid fault information if the predetermined messaging interval has elapsed.

7. A computer-readable recording medium having a fault information collection program recorded thereon for collecting fault information through a redundant network,
   wherein the fault information collection program causes the computer to perform a process of:
   receiving messages containing fault information including indication of a fault, detection date and time of the fault, and messaging interval at which the messages are produced;
   acquiring, in response to input of new fault information including detection date and time of a fault, the latest fault information indicative of a fault related to a fault identical with that of the new fault information from message information storage means storing a plurality of fault information received in the past;
   determining whether or not a predetermined messaging interval has elapsed since the detection date and time of the fault indicated by the latest fault information until the detection date and time of the fault indicated by the new fault information; and
   storing the new fault information in the message information storage means as valid fault information if the predetermined messaging interval has elapsed.

* * * * *